United States Patent
Miura (10) Patent No.: US 7,663,675 B2
(45) Date of Patent: Feb. 16, 2010

(54) IMAGE PROCESSING APPARATUS, IMAGE PROCESSING METHOD, PROGRAM, AND STORAGE MEDIUM WITH LENGTH-TO-BREATH IMAGE CONVERSION AND SUPERIMPOSING OF IMAGES

(75) Inventor: Hiroya Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 11/394,486

(22) Filed: Mar. 31, 2006

(65) Prior Publication Data

US 2006/0221210 A1    Oct. 5, 2006

(30) Foreign Application Priority Data

Apr. 1, 2005    (JP)    ............................. 2005-106791

(51) Int. Cl.
H04N 5/262    (2006.01)
(52) U.S. Cl. ................................. 348/239; 348/333.02
(58) Field of Classification Search ................. 348/239, 348/333.02
See application file for complete search history.

(56) References Cited

U.S. PATENT DOCUMENTS

| | | | | |
|---|---|---|---|---|
| 5,621,459 A | * | 4/1997 | Ueda et al. .................. | 348/239 |
| 6,005,637 A | * | 12/1999 | Suzuki ....................... | 348/584 |
| 6,373,527 B1 | * | 4/2002 | Lee ............................ | 348/564 |
| 7,420,617 B2 | * | 9/2008 | Takechi et al. .............. | 348/445 |
| 2004/0114198 A1 | * | 6/2004 | Jeon et al. ................... | 358/474 |
| 2004/0238718 A1 | * | 12/2004 | Washisu .................. | 250/201.2 |
| 2005/0210388 A1 | * | 9/2005 | Matsumoto ................ | 715/719 |
| 2005/0270407 A1 | * | 12/2005 | Yamaguchi ................ | 348/345 |
| 2006/0056716 A1 | * | 3/2006 | Komeno ..................... | 382/233 |
| 2006/0092188 A1 | * | 5/2006 | Mamba et al. .............. | 345/698 |
| 2006/0110139 A1 | * | 5/2006 | Kojima et al. .............. | 386/131 |

FOREIGN PATENT DOCUMENTS

JP    2002-125193    4/2002

* cited by examiner

Primary Examiner—Tuan Ho
Assistant Examiner—Kent Wang
(74) Attorney, Agent, or Firm—Cowan, Liebowitz & Latman, P.C.

(57) ABSTRACT

This invention prevents quality deterioration and positional shift of OSD when an image and the OSD are to be together displayed by LB display. An image processing apparatus having a function of superposing a second image on a first image includes a converter (103) which converts the length-to-breadth ratio of at least the first image, a first superposing unit (101) which superposes the second image on the first image before the length-to-breadth ratio is converted by the converter (103), and a second superposing unit (105) which superposes the second image on the first image after the length-to-breadth ratio is converted by the converter (103).

17 Claims, 8 Drawing Sheets

IMAGE PROCESSING APPARATUS, IMAGE PROCESSING METHOD, PROGRAM, AND STORAGE MEDIUM WITH LENGTH-TO-BREATH IMAGE CONVERSION AND SUPERIMPOSING OF IMAGES

FIELD OF THE INVENTION

The present invention relates to an image processing technique of superposing OSD (On Screen Display) on an image.

BACKGROUND OF THE INVENTION

In the field of television broadcasting, broadcasting using a display size having a length-to-breadth ratio of "4:3" (length=4, breadth=3) has been conventionally most frequently used. Presently, however, "16:9" broadcasting called wide broadcasting is also beginning to be popular. General household television monitors are also classified into those having "4:3" display screens and those having "16:9" display screens.

Furthermore, many digital video cameras have a function called a "wide image capturing mode", i.e., have a function of capturing an image at a wide field angle of "16:9", in addition to image capturing at a field angle of "4:3". A general wide image capturing mode mainly has two recording/display forms.

In one form, display, output, and recording are performed by reducing effective image lines in order to form an image having a field angle of "16:9" in a field angle of "4:3". When this image is displayed on a display device having a field angle of "4:3", the image having a wide field angle of "16:9" is displayed on the "4:3" screen with black belts being displayed above and below the image, i.e., so-called letter box display (to be referred to as LB display hereinafter) is performed. In this case, the vertical resolution of an effective image is ¾ that of "4:3" full-screen display (in the case of NTSC, 480 lines→360 lines), so the image quality deteriorates.

In the other form, display, output, and recording are performed at a field angle of "4:3" without reducing vertical effective image lines of a "16:9" wide image. When this image is displayed on a display device having a field angle of "4:3", a vertically long image (an image which is horizontally compressed and vertically extended), i.e., a squeezed image is displayed on the "4:3" screen. In this case, the image quality does not deteriorate because the number of effective lines remains the same as in "4:3" recording. However, if an image like this is directly displayed on a display device having a "4:3" field angle, a vertically long image having an incorrect aspect ratio is displayed. Therefore, a "16:9" image having a correct aspect ratio is generally displayed on a television set having a "16:9" display screen capable of wide display, or on a television set having a "4:3" display screen capable of LB display.

On the other hand, a digital video camera has an EVF (Electrical View Finder) or openable/pivotal liquid crystal display as a display function of the camera body, and has a composite video output or S terminal output as a video output to an external TV monitor. Some digital video cameras capable of image capturing at HD (High Definition: the number of horizontal lines is 1,080i or 720p, i is an abbreviation of interface display, and p is an abbreviation of progressive display) use a "16:9" wide EVF or wide liquid crystal display panel. However, general consumer products are digital video cameras which perform image capturing at SD (Standard Definition: the number of horizontal lines is 480i for NTSC and 576i for PAL, i is an abbreviation of interlace display), and use an EVF or liquid crystal display panel having a field angle of "4:3".

When a digital video camera thus having only a "4:3" EVF or liquid crystal display panel is set in a "wide image capturing mode", i.e., in an image capturing mode using a field angle of "16:9", a wide image can be monitored at a correct aspect ratio by performing LB display having upper and lower black belts on the display screen of the "4:3" EVF or liquid crystal display panel. However, some products put on the market display squeezed images on the display screen of a "4:3" EVF or liquid crystal display panel. On these products, captured images cannot be monitored at a correct aspect ratio.

Also, in a video format environment, products compatible with not only the conventional NTSC or PAL system but also a high-definition image (HDTV system) having a higher resolution are put on the market. Various corresponding digital formats are defined by organizations such as ITU (International Telecommunication Union) and SMPTE (Society of Motion Picture and Television Engineers).

Recently, products capable of recording and playing back both SD images and HD images are commercially available as digital video cameras for consumers. Some products can output, by using the HDTV system, an HD image to be played back to a display device capable of receiving and displaying an HD image, and can also output, in accordance with the SD specification, an image having a resolution down-converted from that of an HD image to that of an SD image to a display device capable of receiving and displaying an SD image (e.g., Japanese Patent Application Laid-Open No. 2002-125193).

Figure 8A:
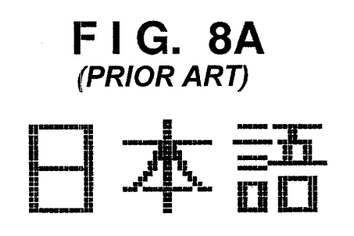
FIGS. 8A to 8C are views showing the deterioration of OSD caused by conventional resolution conversion.
Figure 8B:
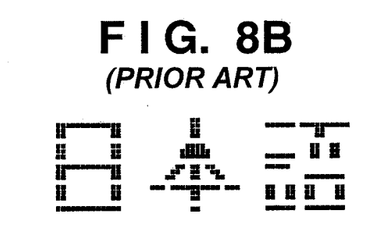
Figure 8C:
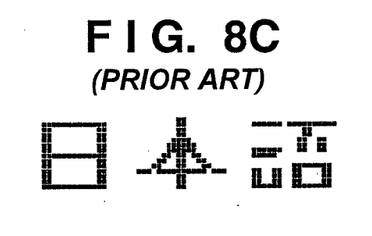

On this background, when an image is to be displayed on a digital video camera in a wide image capturing mode, for example, if the vertical resolutions of this image and OSD (On Screen Display) are together converted to perform LB display on, e.g., the "4:3" display screen of an EVF or liquid crystal display panel of the digital video camera, fine characters of text information and the like are sometimes blurred or missing because the number of vertical effective lines decreases to ¾. Especially when a simple thinning process such as a process which removes one line for every four lines is performed in LB display, the quality of OSD significantly deteriorates as shown in FIG. 8B or 8C compared to normal display as shown in FIG. 8A. This makes OSD difficult to recognize. Even when line resolution conversion is performed by filtering using a digital line filter or the like, the visibility of fine characters and the like unavoidably deteriorates.

By contrast, the deterioration of OSD can be avoided if only an image is displayed by the LB size. In this case, however, the position of OSD deviates from an intended position in the image. Therefore, if the position of OSD with respect to the image has a meaning, e.g., if an AF frame indicating the in-focus position of auto-focusing or a selection frame surrounding a thumbnail image is to be displayed, the positional shift between the image and OSD poses a problem.

If there is only one display destination or output destination, it is relatively easy to adjust the OSD position in accordance with each individual mode. However, if output modes are different, e.g., if a squeezed image is to be output to one display/output destination while an LB image is to be output to the other, it is difficult to control the operation by using common OSD information.

SUMMARY OF THE INVENTION

The present invention has been made in consideration of the above situation, and has as its object to prevent quality deterioration and positional shift of OSD when an image and the OSD are to be together displayed by LB display.

To solve the above problems and achieve the object, according to the first aspect of the present invention, an image processing apparatus including a function of superposing a second image on a first image is characterized by comprising a converting device which converts a length-to-breadth ratio of at least the first image, a first superposing device which superposes the second image on the first image before the length-to-breadth ratio is converted by the converting device, and a second superposing device which superposes the second image on the first image after the length-to-breadth ratio is converted by the converting device.

According to the second aspect of the present invention, an image processing apparatus including a function of superposing a second image on a first image is characterized by comprising a converting device which converts a length-to-breadth ratio of the first image, and a superposing device which superposes the second image on the first image after the length-to-breadth ratio is converted by the converting device, wherein the superposing device superposes the second image on the first image converted by the converting device, such that a positional relationship on a screen between the first image which is not converted by the converting device and the second image is maintained.

According to the third aspect of the present invention, an image processing method of superposing a second image on a first image is characterized by comprising a conversion step of converting a length-to-breadth ratio of at least the first image, a first superposition step of superposing the second image on the first image before the length-to-breadth ratio is converted in the conversion step, and a second superposition step of superposing the second image on the first image after the length-to-breadth ratio is converted in the conversion step.

According to the fourth aspect of the present invention, an image processing method of superposing a second image on a first image is characterized by comprising a conversion step of converting a length-to-breadth ratio of the first image, and a superposition step of superposing the second image on the first image after the length-to-breadth ratio is converted in the conversion step, wherein in the superposition step, the second image is superposed on the first image converted in the conversion step, such that a positional relationship on a screen between the first image which is not converted by the converting device and the second image is maintained.

According to the fifth aspect of the present invention, a program is characterized by causing a computer to execute the image processing method described above.

According to the sixth aspect of the present invention, a storage medium is characterized by storing the program described above in a computer readable form.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will now be described in detail with reference to the accompanying drawings.

First Embodiment

Figure 1:
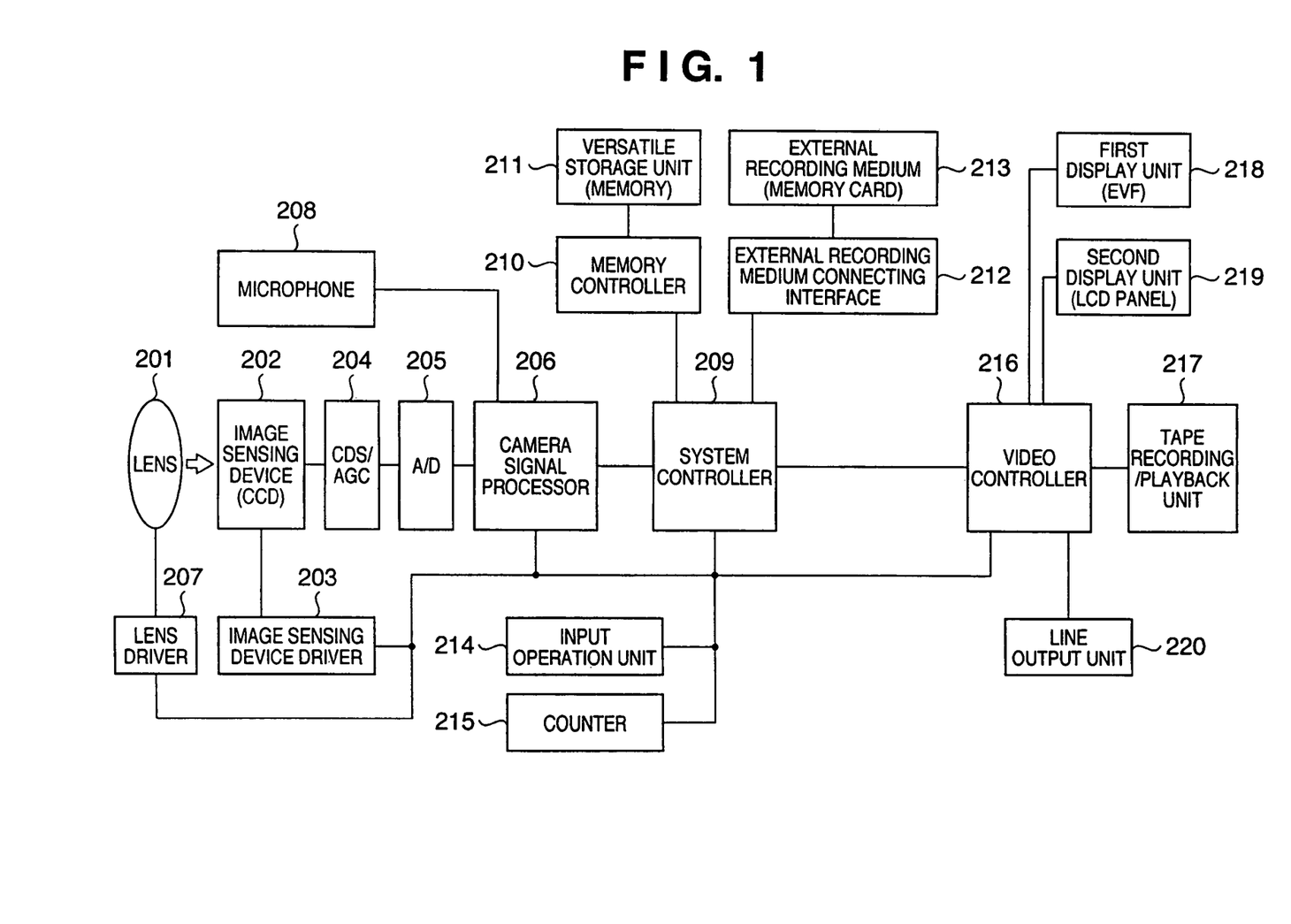
FIG. 1 is a block diagram showing an outline of the block configuration of a digital video camera as an image processing apparatus having an OSD (On Screen Display) superposing function according to the first embodiment of the present invention.
Figure 2:
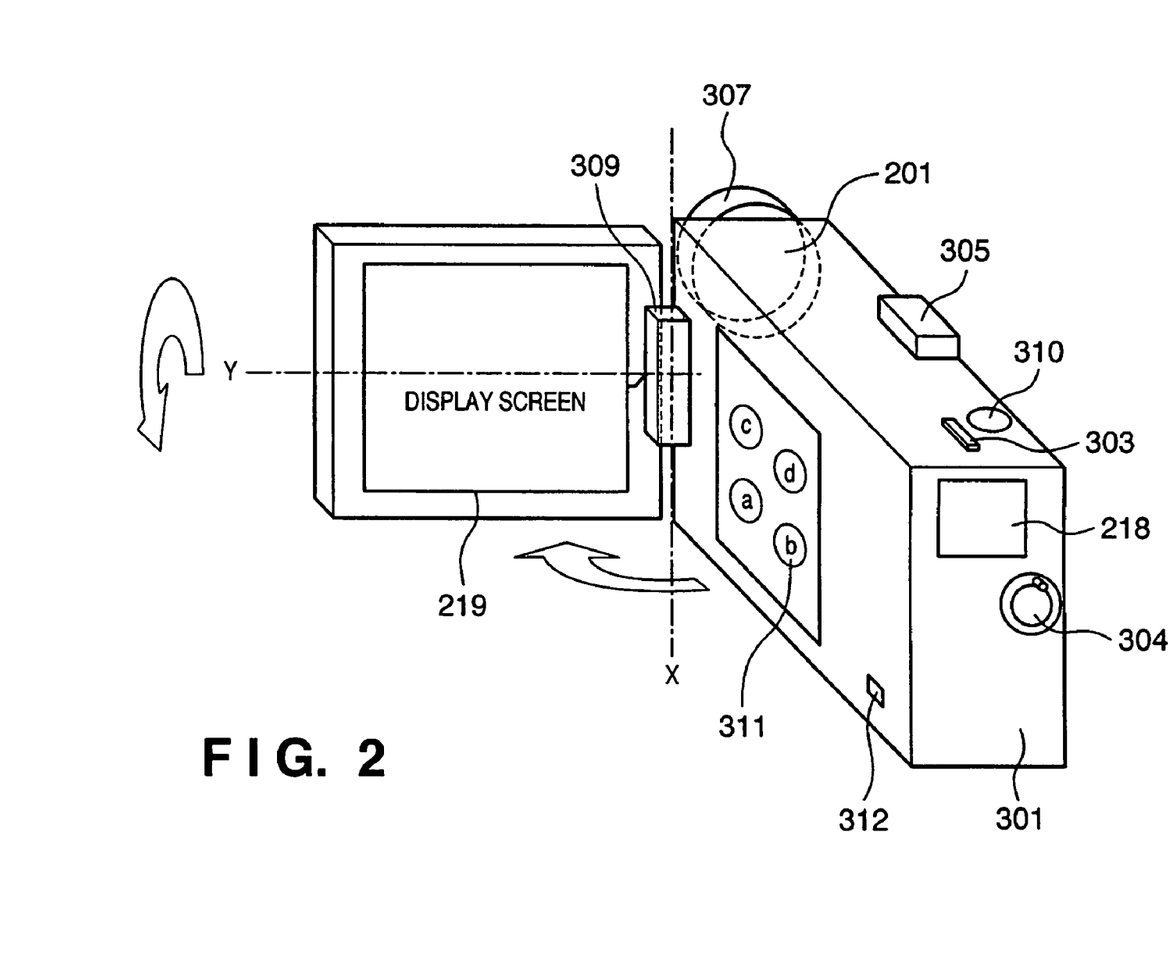
FIG. 2 is a perspective view showing the outer appearance of the digital video camera of the first embodiment.
Figure 3:
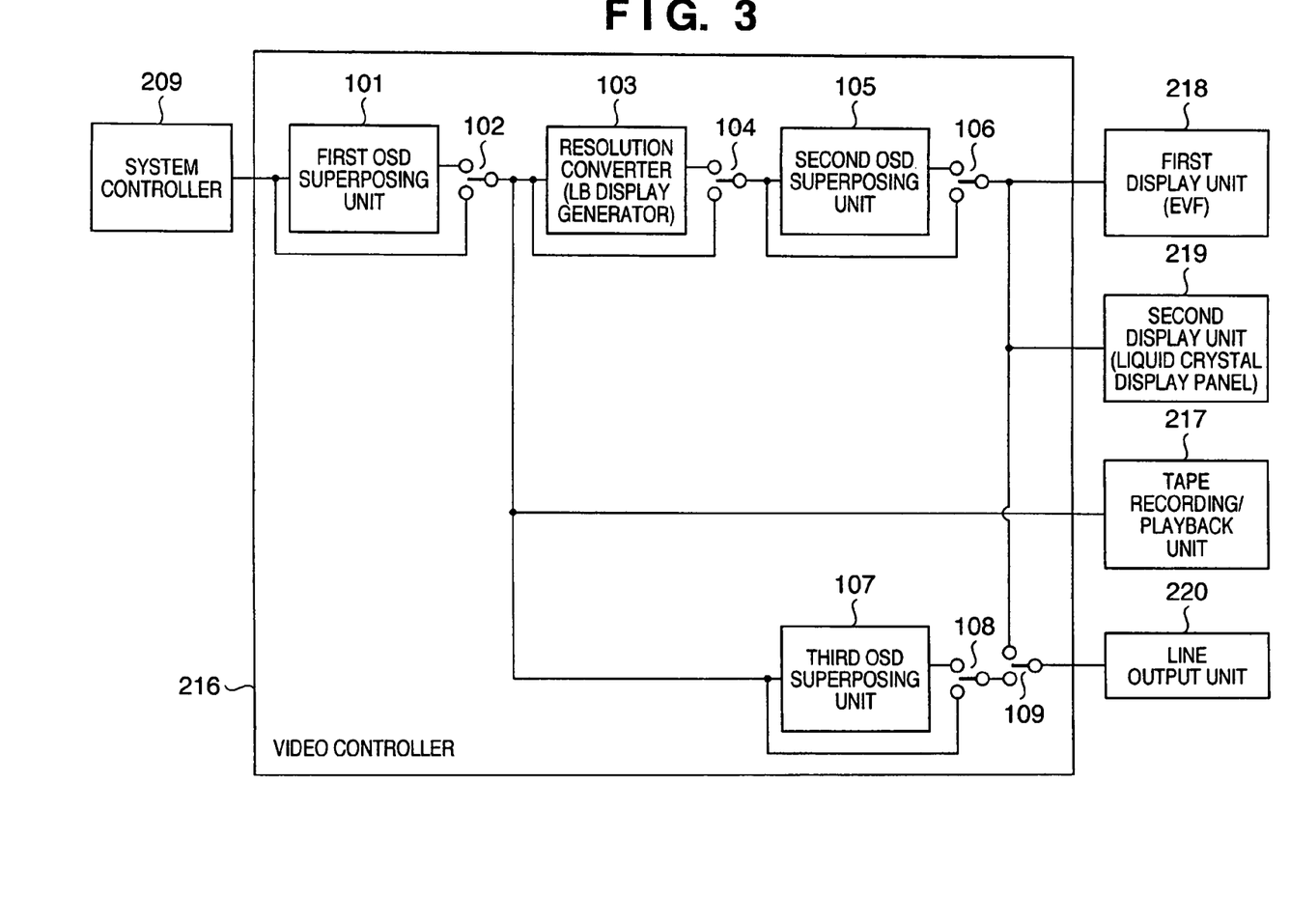
FIG. 3 is a block diagram showing the block configuration of an OSD superposing circuit.

FIG. 1 is a block diagram showing an outline of the block configuration of a digital video camera as an image processing apparatus having an OSD (On Screen Display) superposing function according to the first embodiment of the present invention. FIG. 2 is a perspective view showing the outer appearance of the digital video camera of this embodiment. FIG. 3 is a block diagram showing the block configuration of an OSD superposing circuit.

Referring to FIG. 1, a lens unit 201 of the video camera includes lenses and a lens mechanism having a zoom function and focus adjusting function for sensing an image of an object (not shown).

An image sensing device 202 is a CCD (Charge Coupled Device) or the like, and senses an optical image entering from an optical system formed by the lens unit 201.

An image sensing device driver 203 drives the image sensing device 202 in accordance with timings output from a camera signal processor 206.

A CDS (Correlated Double Sampling)/AGC (Auto Gain Controller) 204 samples an analog signal from the image sensing device 202, and controls the gain of a signal level under the control of a system controller 209.

An A/D (Analog to Digital) converter 205 converts an analog signal from the input stage into a digital signal.

The camera signal processor 206 controls the camera image sensing system in cooperation with the system controller 209, e.g., generates timing signals, controls AE (Auto Exposure), and controls AF (Auto Focus).

A lens driver 207 drives the lens unit 201 to adjust the zooming magnification or focus. In auto-focusing, the camera signal processor 206 detects focus adjustment information, and the lens driver 207 is driven by a control signal from the system controller 209 on the basis of the detected information, thereby adjusting the focus by controlling the lens unit 201. In manual focusing, the user adjusts a focus ring 307 shown in FIG. 2 which belongs to an input operation unit 214 and is generally fitted on the outer circumferential surface of the lens. As an electronic mechanism, the system controller 209 detects the rotational direction and rotation amount of the focus ring 307, and drives the lens driver 207 on the basis of the detected information, thereby adjusting the focus by controlling the lens unit 201. As a mechanical mechanism, the focus ring 307 is mechanically coupled to the lens unit 201. When the user rotates the focus ring 307, the lens unit 201 is mechanically moved to adjust the focus.

A microphone 208 picks up surrounding sounds in order to record the sounds in addition to images input through the image sensing system.

The system controller 209 executes various control sequences in this embodiment, i.e., executes various control sequences related to the control of the digital video camera.

A memory controller 210 controls access to a versatile storage unit 211.

The versatile storage unit 211 is a generic name of a buffer for video signal processing, and a ROM or RAM which stores programs and data for implementing various control operations of this embodiment and is also used as a work area to execute control when needed.

An external recording medium connecting interface 212 is a memory card slot.

An external recording medium 213 is a memory card. Normally, jpeg files are saved on this memory card during still image capturing.

The input operation unit 214 includes an image capturing start/stop button, a select button, an OK button, a shutter button for still image capturing, the manual focus ring, and the like.

A counter 215 includes a real-time clock (RTC) and backup battery, and counts the date and time. In response to a request from the system controller 209, the counter 215 returns date/time information.

A video controller 216 includes a horizontal filter function unit as shown in an example of FIG. 3 of this embodiment. The video controller 216 controls outputs to a first display unit 218, second display unit 219, and line output unit 220, and also controls a tape recording/playback unit 217.

The tape recording/playback unit 217 records or plays back an image signal on or from a tape. This image signal is encoded into a tape recording format by the video controller 216 by using the DV method in the conventional SD image recording mode, and the HDV method in an HD image recording mode.

The first display unit 218 is an EVF (Electrical View Finder) which displays an input image from the image sensing system when the image is to be recorded by the tape recording/playback unit 217, and displays an image recorded on a tape when the image is played back by the tape recording/playback unit 217. The first display unit 218 also displays input operation information entered by the user from the input operation unit 214, arbitrary image information in the external recording medium 213, and the like.

The second display unit 219 is a liquid crystal display panel which displays an input image from the image sensing system when the image is to be recorded by the tape recording/playback unit 217, and displays an image recorded on a tape when the image is played back by the tape recording/playback unit 217. The second display unit 219 also displays input operation information entered by the user from the input operation unit 214, arbitrary image information in the external recording medium 213, and the like.

The line output unit 220 is an interface of an analog component video output, S terminal output, composite video output, and the like. The line output unit 220 is connected to an external TV monitor or the like to display a video output from the digital video camera of this embodiment on the TV screen.

FIG. 2 is a perspective view showing the external appearance of the digital video camera of this embodiment.

Referring to FIG. 2, a main body 301 includes the lens 201, an image recording/playback unit (not shown) which allows attachment and detachment of a tape cassette for recording/playback, the first display unit 218 which is an EVF (Electrical View Finder), and various function switches forming the input operation unit 214, e.g., an eyesight adjustment slider 303, start/stop button 304, zoom switch 305, shutter button 310, and operation button 311. The second display unit 219 which is a liquid crystal display panel is attached to the main body 301 by a pivotal hinge 309. A battery as a power supply is incorporated into the main body.

When the second display unit 219 which is a liquid crystal display unit is not used, the first display unit 218 which is an EVF (Electrical View Finder) displays the same contents as when the liquid crystal display panel is used.

The eyesight adjustment slider 303 moves an eyepiece back and forth so that the user can easily see an image when looking in the first display unit 218, thereby adjusting the focal length of the EVF.

The start/stop button 304 has a mode dial on its outer circumferential surface. Operation modes of the camera such as OFF, a camera image capturing mode, and a tape playback mode can be switched by rotating this mode dial. In normal use, image capturing (recording) is started when the start/stop button is pressed once after the camera mode is set by rotating the mode dial. An image capturing standby mode is set when the button is pressed again, and image capturing (recording) is resumed when the button is pressed again after that. That is, the operation of the mode dial is a toggle operation.

The zoom switch 305 can adjust the field angle to a telephoto side or wide angle side when pushed forward or backward.

The lens optical system 201 adjusts zooming and focusing, and forms an image of light from an object on the image sensing device 202 inside the main body 301.

The manual focus ring 307 allows the user to manually adjust the focus by rotating it in the circumferential direction, when he or she sets a manual focus mode by a switch (not shown).

The second display unit 219 is a liquid crystal display panel which displays an input image from the lens optical system 201, displays an image played back from the tape recording/playback unit (not shown), and displays states concerning control performed by various function switches such as the switches 304, 305, 310, and 311. Also, the second display unit 219 can be pivoted in multiple directions with respect to the main body 301 by the hinge 309.

The hinge 309 connects the second display unit 219 which is a liquid crystal display panel and the main body 301. The second display unit 219 can pivot about the X-axis and the Y-axis perpendicular to the X-axis shown in FIG. 2 as the axes of rotation. For example, when the user (not shown) performs image capturing by raising the camera to a high position, the display screen can be faced down. When the user performs image capturing by holding the camera in a low position, the display screen can be faced up. In this manner, the liquid crystal display panel can be adjusted to an angle at which the user can easily view an image. Also, even when the liquid crystal display panel is rotated by the hinge 309, electrical signal lines (not shown) connecting the interior of the main body 301 and the liquid crystal display panel are neither entangled nor pulled.

The shutter button 310 is often used to record a still image on a tape for a few seconds in the same manner as for a moving image when pressed in an image capturing standby state, or to record an image as a jpeg file on a memory card as the external recording medium 213 while a moving image is being captured.

The operation button 311 is often used to set various modes, or as a playback button in a tape playback mode.

An IEEE 1394 interface 312 is a digital interface which can connect to another digital video camera or an editor such as an external computer by a cable, and can exchange image information and various pieces of control information.

Methods of displaying an image in the EVF and on the liquid crystal display panel or a television monitor as a line output destination when wide image capturing at a "16:9" field angle is performed in the digital video camera shown in FIGS. 1 and 2 will now be explained below.

Figure 7:
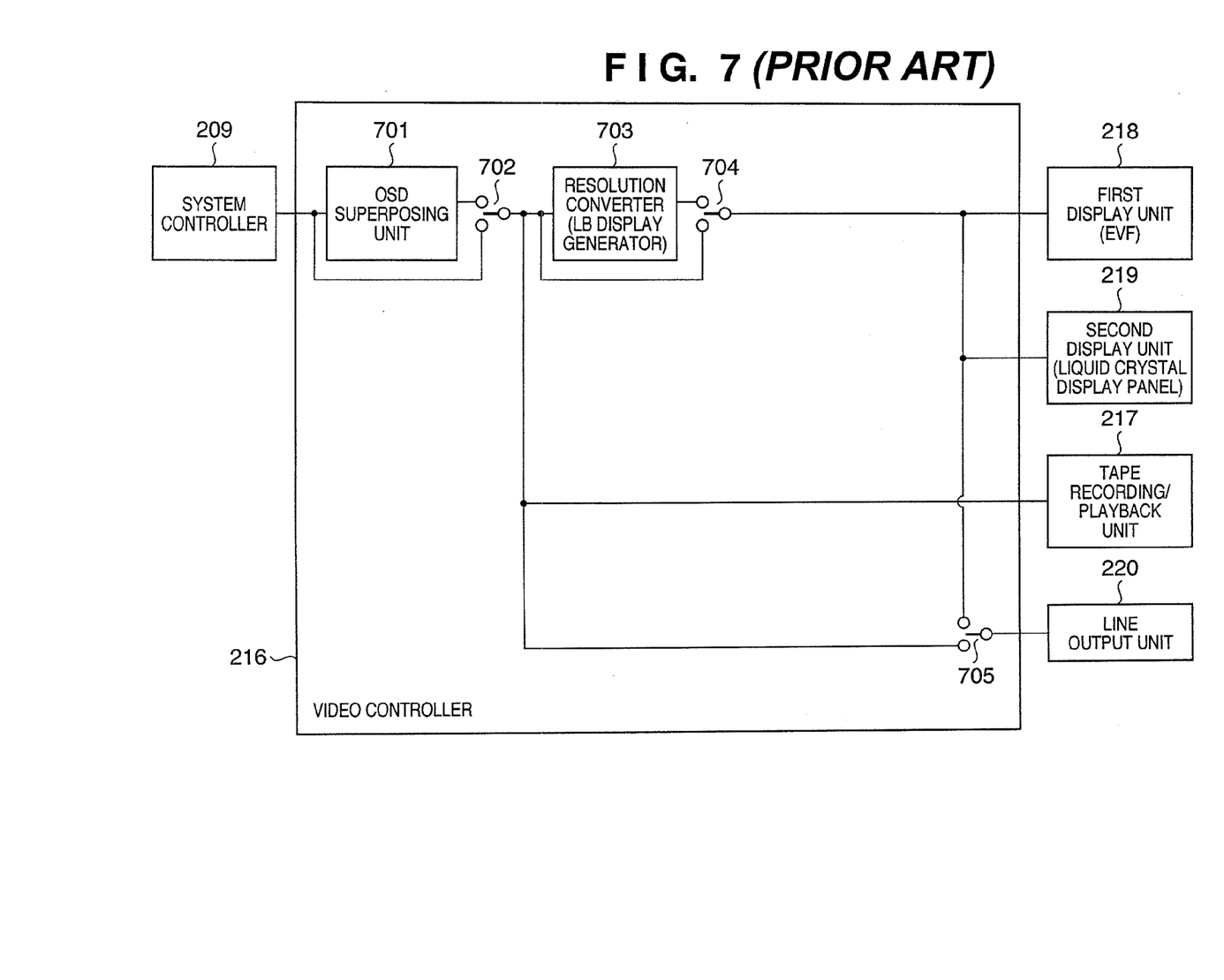
FIG. 7 is a block diagram showing the block configuration of a conventional OSD superposing circuit.

First, the problems of prior art will be described with reference to FIG. 7 showing the arrangement of the prior art. Then, this embodiment will be explained with reference to FIG. 3 showing the block configuration of an OSD superposing circuit as the characteristic feature of this embodiment.

Referring to FIG. 7, an OSD superposing unit, resolution converter, and the like are incorporated into a video controller 216.

An OSD superposing unit 701 can superpose OSD on an image before it passes through a resolution converter 703. Assume that as the input image signal, an image captured in a wide image capturing mode using a "16:9" field angle is input as a squeezed image at a "4:3" field angle to the video controller 216.

Figure 4A:
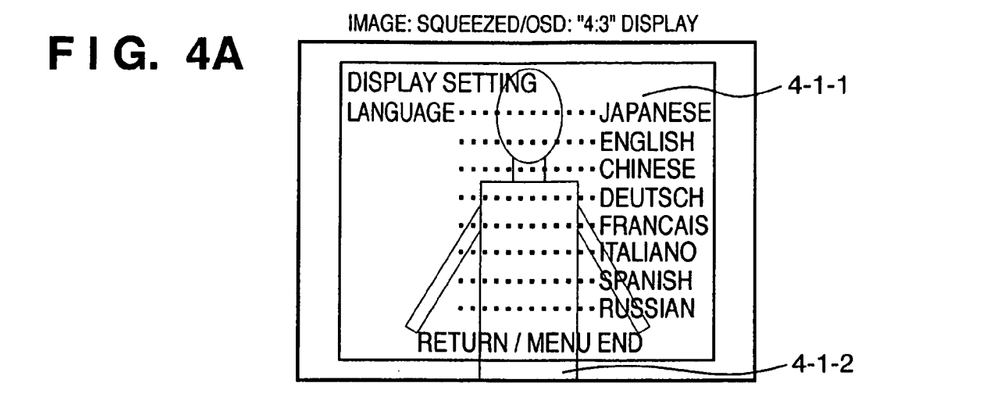
FIGS. 4A to 4C are views each for explaining the state in which OSD is superposed on an image in the first embodiment.

FIG. 4A shows a practical display screen. Referring to FIG. 4A, text information of menu display is superposed as "4:3" OSD 4-1-1 on a "4:3" squeezed image 4-1-2 of a person.

A selector 702 can select whether to superpose OSD on the squeezed image signal in the OSD superposing unit 701. This selection by the selector 702 is designated by the user via the input operation unit 214 and controlled by a system controller 209, or controlled by the system controller 209 in synchronism with the operation mode of the digital video camera.

The resolution converter 703 converts the number of vertical lines in order to convert a squeezed image into a letter box image (LB display). In the case of NTSC, the number of effective display lines is converted from 240 to ¾, i.e., 180 per field, or from 480 to ¾, i.e., 360 per frame. The resolution can be converted by using several methods and systems from the use of a line filter to simple thinning. In this explanation, a simple thinning circuit which is conventionally used in many cases is applied by taking account of the circuit scale and by assuming that the display resolutions of an EVF of a first display unit 218 and a liquid crystal display panel of a second display unit 219 are not as high as that of a TV monitor.

Figure 4B:
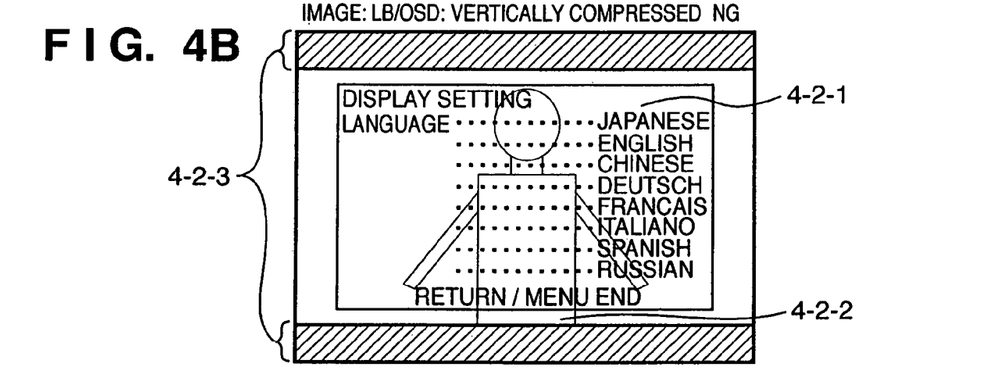

As described above, the image shown in FIG. 4A is obtained by superposing the "4:3" OSD 4-1-1 on the "4:3" squeezed image 4-1-2 by the OSD superposing unit 701. On the other hand, FIG. 4B shows an image converted into LB display having upper and lower black belts 4-2-3 after the vertical resolution is converted by the resolution converter 703. Referring to FIG. 4B, the "4:3" squeezed image 4-1-2 and the "4:3" OSD 4-1-1 superposed on it shown in FIG. 4A are respectively converted into a "16:9" letter box image 4-2-2 and "16:9" OSD 4-2-1 by LB conversion, and black belts 4-2-3 are shown in the upper and lower portions of the screen.

The characters in the OSD 4-2-1 after the LB conversion shown in FIG. 4B do not apparently deteriorate so much. In practice, however, as shown in FIGS. 8A to 8C, the display quality of characters of OSD sometimes significantly deteriorates when the vertical resolution is converted by simple thinning.

The way the quality of OSD characters deteriorates by simple thinning will be explained below.

FIG. 8A shows an image of text information when it is superposed by the OSD superposing unit 701. FIG. 8B shows an image obtained by removing one line for every four lines in the vertically direction (decreasing the vertical resolution to ¾) by simple thinning. FIG. 8C shows an image actually displayed by compressing the thinned image in the vertical direction. As shown in FIGS. 8A to 8C, the display quality is sometimes largely influenced when small characters are displayed by kanji characters or the like. Even when not simple thinning but resolution conversion using a vertical line filter is performed, information of thin lines and the like is easily lost, so the display quality similarly deteriorates. For the sake of simplicity, this prior art is explained as if LB processing were performed in frame display. However, this processing is actually performed on a field in NTSC interface display. Details are not explained since the reason for deterioration of the display quality of OSD characters caused by processing such as simple thinning is the same.

Referring back to FIG. 7, a selector 704 can select whether to convert the resolution of an image signal in the resolution converter 703, i.e., whether to convert the vertical resolution to perform letter box display. This selection by the selector 704 is designated by the user via the input operation unit 214 and controlled by the system controller 209, or controlled by the system controller 209 in synchronism with the operation mode of the digital video camera.

A selector 705 can select whether to output the same image as the first display unit 218 or second display unit 219 to the line output unit 220, or output an image signal from the selector 702 to the line output unit. This selection by the selector 705 is designated by the user via the input operation unit 214 and controlled by the system controller 209, or controlled by the system controller 209 in synchronism with the operation mode of the digital video camera.

The foregoing is the explanation of the prior art. The present invention will be explained below with reference to FIG. 3 showing the block configuration of the OSD superposing circuit in the digital video camera as the image processing apparatus having the OSD superposing function of this embodiment. The OSD superposing unit, resolution converter, and the like are incorporated into the video controller 216.

A first OSD superposing unit 101 can superpose OSD on an image before it passes through the resolution converter 103. Assume that as the input image signal, an image captured in a wide image capturing mode using a "16:9" field angle is input as a squeezed image at a "4:3" field angle to the video controller 216.

A selector 102 can select whether to superpose OSD on the squeezed image signal in the first OSD superposing unit 101. This selection by the selector 102 is designated by the user via the input operation unit 214 and controlled by the system controller 209, or controlled by the system controller 209 in synchronism with the operation mode of the digital video camera of this embodiment.

The difference from the circuit shown in FIG. 7 is that in order to avoid deterioration of the OSD quality as shown in FIG. 8C, the first OSD superposing unit 101 does not superpose any OSD information such as text information, but superposes OSD dependent on the positional relationship with an image, for the purpose to be explained later. Therefore, no "4:3" OSD is superposed on the "4:3" squeezed image. That is, the selector 102 selects the input terminal of the "4:3" squeezed image.

A resolution converter 103 converts the number of vertical lines in order to convert a squeezed image into a letter box image. In the case of NTSC, the number of effective display lines is converted from 240 to ¾, i.e., 180 per field, or from 480 to ¾, i.e., 360 per frame. The resolution can be converted by using several methods and systems from the use of a line filter to simple thinning. In this explanation, a simple thinning circuit which is conventionally used in many cases is applied by taking account of the circuit scale and by assuming that the display resolutions of the EVF of the first display unit 218 and the liquid crystal display panel of the second display unit 219 are not as high as that of a TV monitor.

In this case, only the "4:3" squeezed image is converted into a letter box.

A selector 104 can select whether to convert the resolution of an image signal in the resolution converter 103, i.e., whether to convert the vertical resolution to perform letter box display. This selection by the selector 104 is designated by the user via the input operation unit 214 and controlled by the system controller 209, or controlled by the system controller 209 in synchronism with the operation mode of the digital video camera.

A second OSD superposing unit 105 can superpose OSD on an image signal having passed through the selector 102, or on an image having passed through the resolution converter 103, and superposes OSD independent of the positional relationship with an image.

Figure 4C:
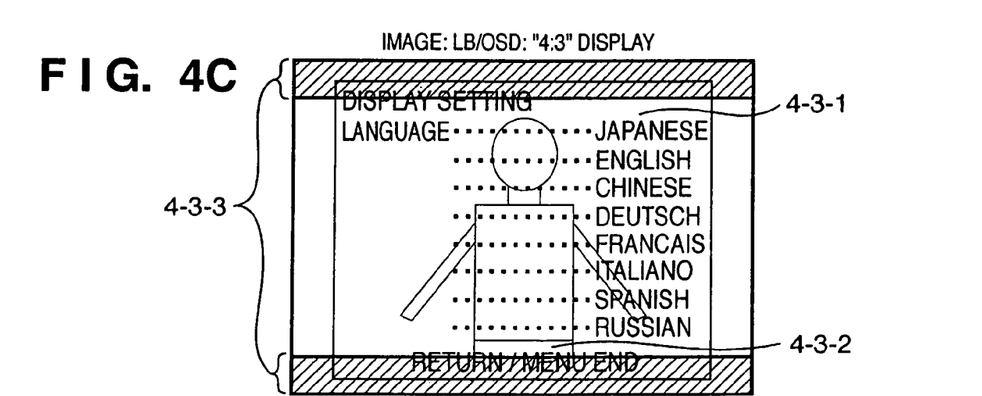

FIG. 4C shows an image after the superposition. Referring to FIG. 4C, "4:3" OSD 4-3-1 superposed by the second OSD superposing unit 105 is displayed on a "16:9" letter box image 4-3-2 converted into a letter box by the resolution converter 103. Since the resolution of this OSD is not converted unlike in the image shown in FIG. 4B, the display quality does not deteriorate.

In this case, however, the following problem may arise.

Figure 5A:
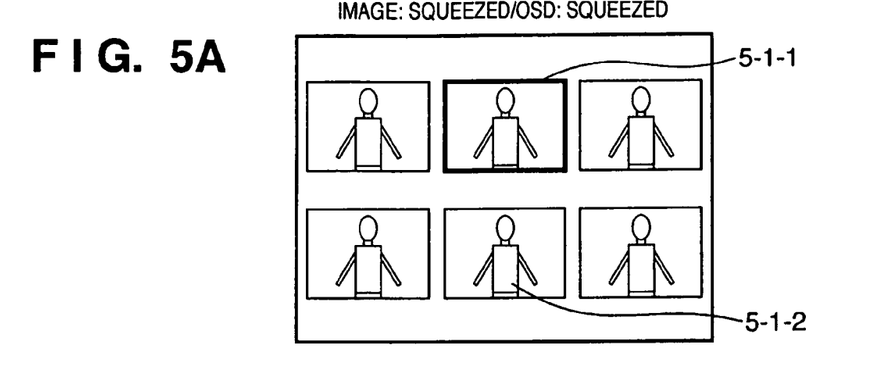
FIGS. 5A to 5C are views each for explaining the state in which OSD is superposed on an image in the first embodiment.
Figure 5B:
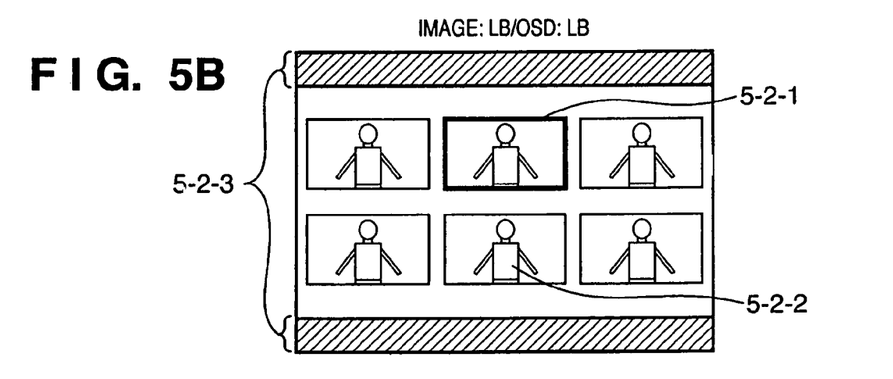
Figure 5C:
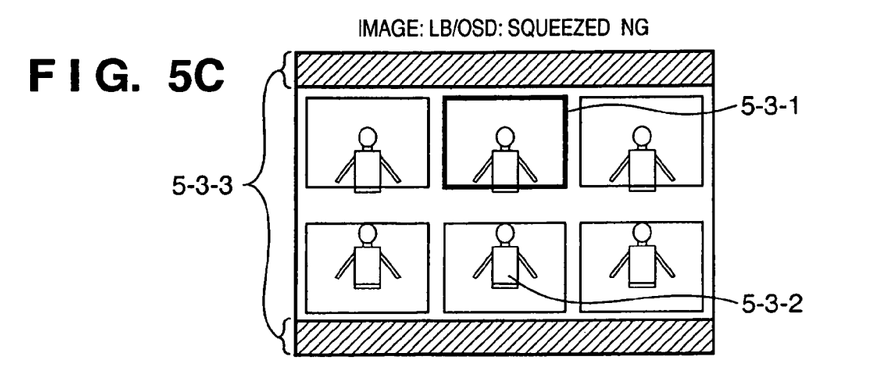

When a selection frame surrounding a given thumbnail image is to be superposed by "4:3" OSD on a "4:3" squeezed image shown in FIG. 5A which is, e.g., a display of a thumbnail list, if the first OSD superposing unit 101 performs superposition beforehand and the resolution converter 103 performs letter box display conversion after that, the image and the frame indicated by OSD do not deviate from each other, so a "16:9" letter box image can be displayed as shown in FIG. 5B. However, as shown in FIG. 5C, if the same "4:3" OSD 5-1-1 is superposed by the second OSD superposing unit 105, a difference is sometimes produced between the "16:9" letter box image and the selection frame formed by "4:3" OSD 5-3-1. It is also necessary to prevent a positional shift between a thumbnail image and its attribute information which is attached to the selection frame of the thumbnail image.

To avoid and prevent this problem, the first OSD superposing unit 101 before the resolution converter 103 superposes OSD dependent on the positional relationship with an image in advance, and then the resolution converter 103 performs letter box display conversion. On the other hand, OSD such as text information whose display quality may deteriorate by letter box conversion is superposed by the second OSD superposing unit 105 on an image having undergone letter box display conversion by the resolution converter 103.

Referring back to FIG. 3, a selector 106 can select whether to superpose OSD on an image signal in the second OSD superposing unit 105. This selection by the selector 106 is designated by the user via the input operation unit 214 and controlled by the system controller 209, or controlled by the system controller 209 in synchronism with the operation mode of the digital video camera.

A third OSD superposing unit 107 basically operates in the same manner as the second OSD superposing unit 105. The third OSD superposing unit 107 superposes OSD on a system to the line output unit 220 which outputs an image to an external television monitor.

A selector 108 can select whether to superpose OSD on the output image signal from the selector 102 in the third OSD superposing unit 107. This selection by the selector 108 is designated by the user via the input operation unit 214 and controlled by the system controller 209, or controlled by the system controller 209 in synchronism with the operation mode of the digital video camera.

A selector 109 can select whether to output the same image as the first display unit 218 or second display unit 219 to the line output unit 220, or output the image signal from the selector 108 to the line output unit. This selection by the selector 109 is designated by the user via the input operation unit 214 and controlled by the system controller 209, or controlled by the system controller 209 in synchronism with the operation mode of the digital video camera.

As has been explained above, the digital video camera of this embodiment includes a plurality of OS superposing functions before and after LB conversion. Even in an environment in which both LB display and squeezed output exist as display/output to, e.g., an EVF, liquid crystal display panel, or television monitor, therefore, information whose display quality deteriorates by resolution conversion, such as OSD including text information, is superposed after LB display conversion, and OSD dependent on the positional relationship with an image, such as a display frame whose display quality does not largely deteriorate even after LB display conversion, is superposed in advance before LB display conversion.

With this arrangement, when an image and OSD are together converted into letter box display (by vertical resolution conversion, simple thinning, or the like), the OSD can be performed without deteriorating the display quality of particularly text information of the OSD, and without posing a problem such as a positional shift even for OSD dependent on the position of an image.

As a method different from this embodiment, instead of superposing OSD dependent on the positional relationship with an image beforehand by the first OSD superposing unit 101, it is also possible to superpose OSD on an image output from the resolution converter 103 by the second OSD superposing unit 105, such that the positional relationship is the same as that when OSD is superposed on an image before the resolution converter 103.

Possible examples of OSD dependent on the positional relationship with an image are a display frame of a thumbnail, and an auto-focus frame (AF frame) indicating the in-focus position of auto-focusing. Even when resolution conversion is performed on OSD like this by the resolution converter 103, practically no problem arises as long as fine expressions such as characters have no large influence on the visibility.

Second Embodiment

The second embodiment of an image processing apparatus having an OSD superposing function will be described below with reference to the accompanying drawings. The difference of the second embodiment from the first embodiment is a portion related to an OSD superposing method in a second OSD superposing unit 105.

Figure 6A:
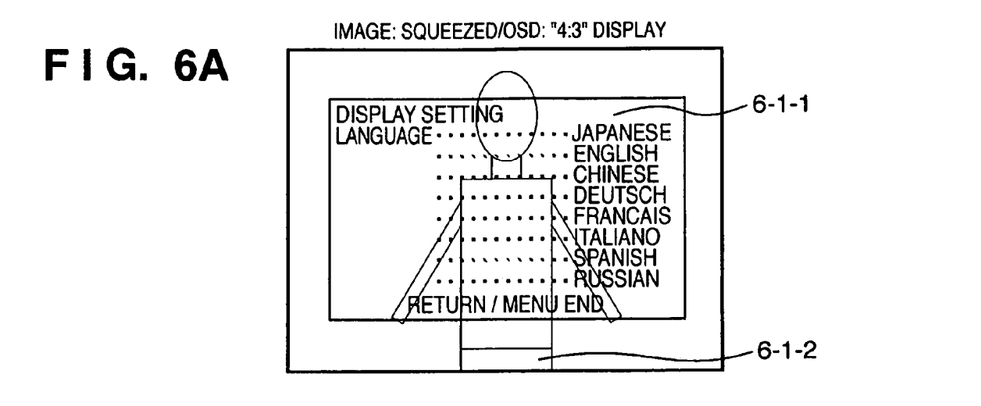
FIGS. 6A to 6C are views each for explaining the state in which OSD is superposed on an image in the second embodiment.
Figure 6B:
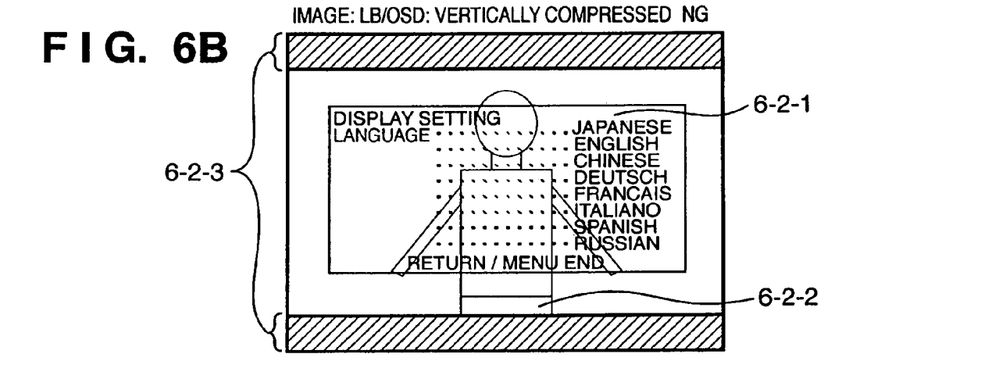
Figure 6C:
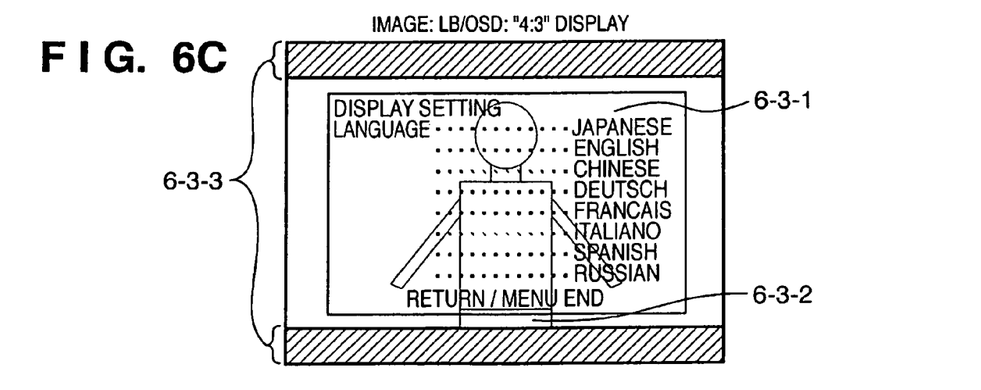

Of FIGS. 6A to 6C, a display method as shown in FIG. 6C differs from FIG. 4C. Referring to FIG. 4C, the second OSD superposing unit 105 superposes the "4:3" OSD 4-3-1 on the "16:9" letter box image 4-3-2 having undergone LB display conversion, with no limits within the range of a "4:3" field angle. In this embodiment, however, as shown in FIG. 6C, the display range of "4:3" OSD is limited within an effective image of a "16:9" letter box image. Accordingly, "4:3" OSD 6-3-1 does not overlap upper and lower black belts 6-3-3 as shown in FIG. 6C.

It is also possible to improve the visibility of the "4:3" OSD 6-3-1 by changing the color of the upper and lower black belts 6-3-3 from black to any arbitrary color. This change to an arbitrary color may also be simply realized by displaying colored belts as OSD on the upper and lower black belts 6-3-3 by using the function of the second OSD superposing unit 105.

As described above, the digital video camera of the second embodiment makes it possible not only to prevent deterioration of the display quality of OSD caused by resolution conversion, but also to improve the visibility by superposing OSD within the effective image range of letter box display, and reduce the apparent difference between a squeezed image and OSD superposed on it, thereby obtaining the sense of unity of an image and OSD displayed and/or output to a plurality of output destinations. In addition, even when OSD overlaps the upper and lower black belts of letter box display, the visibility of the OSD can be improved by the function of changing the color of these black belts to any arbitrary color.

The present invention is applicable to various video apparatuses. Especially when a digital video camera which is a video recording/playback apparatus with a camera displays, outputs, or records a "16:9" wide image to a plurality of display destinations, output destinations, or recording destinations, e.g., an EVF, liquid crystal display panel, television monitor, and tape recording, it is possible to select LB display/output or squeezed display/output in accordance with a given display/output destination. It is also possible to independently superpose OSD which is dependent on the positional relationship with an image, and OSD of information such as characters which is not largely dependent on the positional relationship with an image. As a consequence, an OSD function which does not deteriorate the quality of OSD and the positional relationship with a main image can be realized.

Note that the present invention can be applied to modified or corrected forms of the above embodiments without departing from the spirit and scope of the invention.

As has been explained above, the above embodiments can prevent quality deterioration and positional shift of OSD when an image and the OSD are to be together displayed by LB display.

Other Embodiment

It is of course also possible to achieve the objects of the above embodiments by supplying a storage medium (or a recording medium) recording the program code of software for implementing the functions of the embodiments to a system or apparatus, and reading out and executing the program code stored in the storage medium by a computer (or a CPU or MPU) of the system or apparatus. In this case, the program code read out from the storage medium implements the functions of the embodiments, and the storage medium storing this program code constitutes the invention. Also, besides the functions of the above embodiments are implemented by executing the readout program code by the computer, the present invention naturally includes a case where an operating system (OS) or the like running on the computer performs part or the whole of actual processing in accordance with designations by the program code, thereby implementing the functions of the embodiments.

Furthermore, the present invention of course includes a case where the program code read out from the storage medium is written in a memory of a function expansion card inserted into the computer or of a function expansion unit connected to the computer, and, in accordance with designations by the program code, a CPU or the like of the function expansion card or function expansion unit performs part or the whole of actual processing, thereby implementing the functions of the above embodiments.

When the present invention is applied to the storage medium described above, this storage medium stores a program code corresponding to the sequence explained earlier.

The present invention is not limited to the above embodiments and various changes and modifications can be made within the spirit and scope of the present invention. Therefore, to apprise the public of the scope of the present invention, the following claims are made.

This application claims the benefit of Japanese Patent Application No. 2005-106791 filed on Apr. 1, 2005, which is hereby incorporated by reference herein in its entirety.

What is claimed is:

1. An image processing apparatus including a function of superposing a second image on a first image, comprising:
   a converting device which converts a length-to-breadth ratio of at least the first image;
   a first superposing device which superposes the second image on the first image before the length-to-breadth ratio is converted by said converting device; and
   a second superposing device which superposes the second image on the first image after the length-to-breadth ratio is converted by said converting device,
   wherein, when the first image converted by said converting device is to be displayed on a display device comprising a screen with a length-to-breadth ratio corresponding to the length-to-breadth ratio of the first image which is not converted by said converting device, said second superposing device superposes the second image on the first image such that the second image is displayed within an effective range of the first image displayed on the screen of said display device.

2. The apparatus according to claim 1, wherein, in a case in which a positional relationship of the second image to the first image on a screen is important, said first superposing device superposes the second image on the first image, and then said converting device converts the length-to-breadth ratio of the superposed image, and, in a case in which the positional relationship of the second image to the first image on a screen is not important, said converting device converts the length-to-breadth ratio of the first image, and then said second superposing device superposes the second image on the first image including the converted length-to-breadth ratio.

3. The apparatus according to claim 2, wherein the case in which the positional relationship of the second image to the first image on a screen is important is a case in which the second image comprises an auto-focus frame indicating an in-focus position on the screen.

4. The apparatus according to claim 2, wherein the case in which the positional relationship of the second image to the first image on a screen is important is a case in which the second image comprises a selection frame indicating that a predetermined region on the screen is selected.

5. The apparatus according to claim 2, wherein the case in which the positional relationship of the second image to the first image on a screen is important is a case in which the first image comprises a plurality of thumbnail images, and the second image comprises attribute information related to a thumbnail image.

6. The apparatus according to claim 2, wherein the case in which the positional relationship of the second image to the first image on a screen is not important is a case in which the second image comprises arbitrary character information.

7. The apparatus according to claim 1, wherein said converting device converts a squeezed image into a letter box image.

8. The apparatus according to claim 1, further comprising a setting device which, when the first image converted by said converting device is to be displayed on a display device comprising a screen with a length-to-breadth ratio corresponding to the length-to-breadth ratio of the first image which is not converted by said converting device, sets an arbitrary color as a color of a region except for an effective range of the first image displayed on the screen of said display device.

9. An image processing method of superposing a second image on a first image, comprising:
    a conversion step of converting a length-to-breadth ratio of at least the first image;
    a first superposition step of superposing the second image on the first image before the length-to-breadth ratio is converted in the conversion step; and
    a second superposition step of superposing the second image on the first image after the length-to-breadth ratio is converted in the conversion step,
    wherein, when the first image converted in the conversion step is to be displayed on a display device comprising a screen with a length-to-breadth ratio corresponding to the length-to-breadth ratio of the first image which is not converted in the conversion step, the second image is superposed on the first image in the second superposition step such that the second image is displayed within an effective range of the first image displayed on the screen of the display device.

10. The method according to claim 9, wherein, in a case in which a positional relationship of the second image to the first image on a screen is important, the second image is superposed on the first image in the first superposition step, and then the length-to-breadth ratio of the superposed image is converted in the conversion step, and, in a case in which the positional relationship of the second image to the first image on a screen is not important, the length-to-breadth ratio of the first image is converted in the conversion step, and then the second image is superposed on the first image including the converted length-to-breadth ratio in the second superposition step.

11. The method according to claim 10, wherein the case in which the positional relationship of the second image to the first image on a screen is important is a case in which the second image comprises an auto-focus frame indicating an in-focus position on the screen.

12. The method according to claim 10, wherein the case in which the positional relationship of the second image to the first image on a screen is important is a case in which the second image comprises a selection frame indicating that a predetermined region on the screen is selected.

13. The method according to claim 10, wherein the case in which the positional relationship of the second image to the first image on a screen is important is a case in which the first image comprises a plurality of thumbnail images, and the second image comprises attribute information related to a thumbnail image.

14. The method according to claim 10, wherein the case in which the positional relationship of the second image to the first image on a screen is not important is a case in which the second image comprises arbitrary character information.

15. The method according to claim 9, wherein a squeezed image is converted into a letter box image in the conversion step.

16. The method according to claim 9, further comprising a setting step of, when the first image converted in the conversion step is to be displayed on a display device comprising a screen with a length-to-breadth ratio corresponding to the length-to-breadth ratio of the first image which is not converted in the conversion step, setting an arbitrary color as a color of a region except for an effective range of the first image displayed on the screen of the display device.

17. A computer readable storage medium storing a program which causes a computer to execute an image processing method cited in claim 9.

* * * * *